United States Patent [19]

Blundell

[11] 4,205,105

[45] May 27, 1980

[54] PIPE INSULATION

[75] Inventor: Kenneth Blundell, Shipley, England

[73] Assignee: P. H. Thermal Products Limited, Eldwick, England

[21] Appl. No.: 862,094

[22] Filed: Dec. 19, 1977

[30] Foreign Application Priority Data

Jan. 21, 1977 [GB] United Kingdom ................ 2628/77

[51] Int. Cl.² ............................ F16L 9/22; B32B 3/02
[52] U.S. Cl. ..................................... 428/36; 138/120; 138/128; 138/151; 138/157; 138/178; 428/65
[58] Field of Search ............... 138/120, 128, 151, 156, 138/157, 178; 428/36, 65

[56] References Cited

U.S. PATENT DOCUMENTS

| 2,820,480 | 1/1958 | O'Rourke, Jr. et al. | 138/151 |
| 3,060,972 | 10/1962 | Sheldon | 138/120 |
| 3,620,258 | 11/1971 | Graham | 138/178 |
| 4,054,985 | 10/1977 | Aleniusson | 138/151 |
| 4,063,573 | 12/1977 | Harting et al. | 138/155 |

Primary Examiner—William R. Dixon, Jr.
Attorney, Agent, or Firm—Diller, Ramik & Wight

[57] ABSTRACT

Pipe insulation is disclosed made up of right cylindrical elements, or washers, held together by a flexible coating and in which the fibres are aligned in planes perpendicular to the cylindrical axis. The elements have central bores to receive pipes to be lagged. The elements have excellent axial compressibility and can therefore be used around bends in pipes without cutting.

5 Claims, 4 Drawing Figures

PIPE INSULATION

This invention relates to pipe insulation.

Thermal insulation for pipes carrying fluids is widely used, both to protect the pipes from frost damage and to prevent undue heat loss from pipes carrying hot fluids. The latter is increasingly important as energy costs rise: unwanted heat losses from piping can be very expensive. Thermal insulation for typical domestic use, for example lagging for central heating or hot water pipes where they pass below floors, generally comprises either foamed plastics materials or inorganic fibres, particularly glass fibres. Glass fibre pipe lagging has a number of advantages but its use has been somewhat restricted to date since problems arise on curved sections of pipe or elbows. The existing types of fibrous lagging are normally supplied in axially split cylindrical lengths but these are not sufficiently flexible to follow the contours of bends or elbows, and often the plumber fitting such lagging must cut a number of wedge-shaped rings the length of lagging and pack these manually round each bend or elbow. This is time consuming, inconvenient and often thermally inefficient.

The invention seeks to provide a fibrous lagging which may be supplied in lengths that are sufficiently flexible to be used on both straight and curved portions of pipe without special manipulation.

According to the present invention there is provided insulation for lagging pipes which comprises a plurality of right cylindrical elements of inorganic fibres held together by a surface coating of a flexible material, the elements having a bore therein in which the pipe is to be located and the fibres in the elements lying substantially in planes perpendicular to the cylindrical axis thereof.

By virtue of the fact that the fibres lie in planes transverse to the bore, the insulation may have a high degree of compressibility in the axial direction relative to the bore, in which case it is extremely suitable for lagging curved pipes as the insulation will simply compress axially of the pipe to accommodate the bends in the pipe.

The right cylindrical elements, hereinafter referred to as "washers" for convenience, may be produced by stamping or punching from a stack of sheets of glass fibre of which each sheet has the fibres thereof lying in the plane of the sheet. The washers may be applied directly to the pipe to be lagged or they may preferably be first connected together into a length of insulation by a flexible outer cover, coating or layer. Lenghts of insulation may be used in combination with individual washers depending upon the length and shape of pipe to be insulated.

The insulation may be applied in either of two ways; firstly by slipping the insulation over the pipe axially thereof; or secondly by providing a radial slit in the insulation which opens into said bore, and slipping the insulation over the pipe radially thereof by opening said slit. Either method can be adopted, but clearly the second possibility will carry the advantage when the insulation is required for pipe work which has already been installed, because with this possibility, there is no need to disconnect any pipes. However, if the disconnection of the pipes is a simple matter, then the first possibility can be used.

Where the washers have the said radial slit, it preferably extends partially to the wall on the diametrically opposite side of the bore, so that opening of the washers is easy and the washers will spring back to their initial shape after they have been opened in being passed over the pipe.

Where a length of washers joined together is provided, the means joining the washers together may take any suitable form and may also serve the purpose of strengthening and protecting the insulation. One possibility for the holding of the washers together is to wrap a plurality of the washers in an outer cover of suitable material such as cotton scrim, mutton cloth, glass fibre sheet or plastics material which may be attached to the washers by adhesive if desired. Where, however, there is a sufficient cohesion affinity between the glass fibres of the washers and the covering, then it is possible to dispense with the adhesive. Such is the case where a glass fibre sheet is used because the radially disposed fibres of the washers engage at right angles and penetrate the sheet of which the fibres lie circumferentially of the insulation. The free edges of the covering can be tucked into the aligned slits in the washers where such slits are provided.

However it is greatly preferred to hold the washers together by a suitable liquid coating which sets to a flexible coating applied thereto for example by spraying, dipping or brushing. Such a coating could be a natural or synthetic rubber or other synthetic resinous material, for example, polyvinyl chloride, polyolefines, acrylics, nitrile, thiol or silicone rubbers, polytetrafluoroethylene or, preferably, a polyurethane rubber.

As a further possibility, and this could be used with either or both of the above methods, the washers could be held together, mechanically as by cotton thread or twine threaded through the washers or wrapped round the outer faces and the bore of the washers.

Although washers are usually taken to be circular, we wish to point out that as far as this specification is concerned, the term has been used because a circular washer will be used most in practice. However, the bore and outer peripheral shape of the washer are not in essence in this invention and clearly a washer of which the bore or outer periphery is hexagonal, oval or even square could be used and an insulating effect achieved thereby.

Embodiments of the invention will now be described, by way of example, with reference to the accompanying drawings, wherein.

Figure 1:
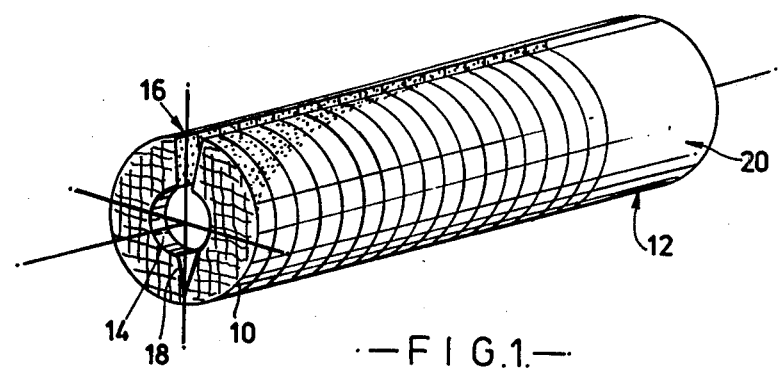
FIG. 1 is a perspective view to an enlarged scale of pipe insulation according to a first embodiment of the invention, parts being shown in chain dotted lines for clarity.
Figure 2:
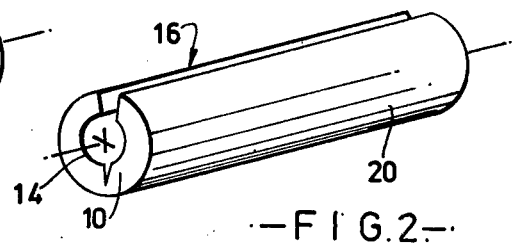
FIG. 2 is a perspective view of the length of insulation shown in FIG. 1.
Figure 3:
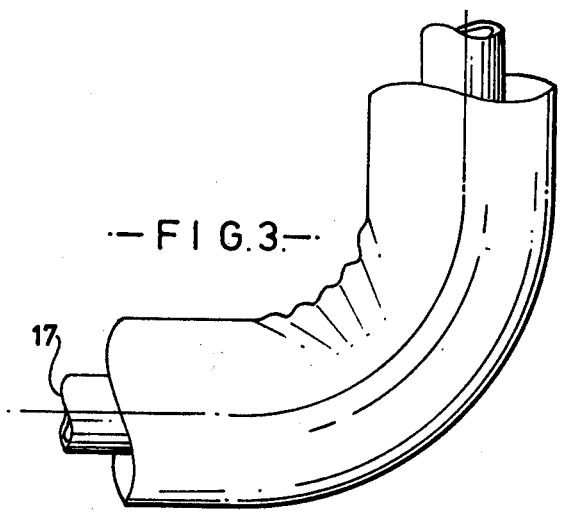
FIG. 3 is a side view of the length of insulation of FIGS. 1 and 2, but in a different position.

Referring to the drawings, in the embodiment of FIGS. 1 to 3, the insulation or lagging 12 is made up of a plurality of similar washers 10 (FIG. 1). Each washer may be stamped out of a relatively thick sheet of glass fibres, or a number may be stamped simultaneously out a number of thinner sheets stacked up. The fibres in the sheet or sheets lie in planes substantially perpendicular to the axis of the bore 14 in the washer, i.e. to the cylindrical axis of the right cylindrical elements. The pipe 17 to be insulated is located in the bore 14. The washer 10 has a radial slit 16 which opens same and extends to the other side of bore 14 as shown at 18. By extending the slit 16 to the other side of bore 14, the lagging 12 can be opened out easily so that it can be easily slipped over pipe 17, and when released will return to its initial position as shown in FIG. 1.

The washers 10 are consolidated and held into the length of lagging 12 by a surface coating 20 of a polyurethane rubber. This is conveniently applied by spraying from a solvent. A particularly useful commercially available product is Daltoflex 635 (I.C.I.) which is dissolved in ethyl acetate, e.g. to form a 5% or 10% solution, together with Suprasec L (I.C.I.) which is a curing agent for the polyurethane system. This solution is sprayed onto an assembly of washers 10 either continuously or batch-wise and allowed to cure to a flexible coating 20.

FIG. 3 shows how the length of insulation may be bent to suit the shape of the pipe to be lagged. By virtue of the construction of the invention the length of insulation can be bent through any angle, including right angled elbows as shown in FIG. 3.

Figure 4:
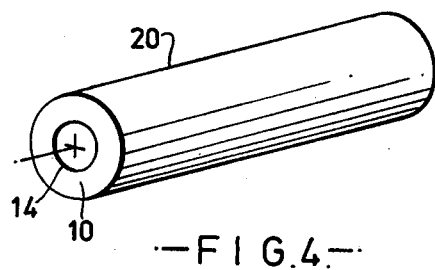
FIG. 4 is a perspective view of pipe insulation according to a second embodiment of the invention.

In the embodiment of FIG. 4, the main difference from the previous embodiment is that the washers are closed i.e. slit 16 is omitted so that this insulation has to be applied to the pipe by sliding same axially of the pipe and over the end thereof. Owing to the omission of the slitting step this version may be cheaper; and where it is to be used when installing pipes it is equally convenient. The extreme flexibility of the lagging allows it to be compressed axially when making a join in the pipe after which it will spring back to cover the join.

The insulation may be supplied in a long coiled length which is subsequently severed into the required lengths which are then applied to the pipe work either by sliding axially over the pipes, as with the FIG. 4 embodiment or opening the lengths along slit 16 and slipping the insulation over the pipes as with the FIGS. 1 to 3 embodiment. Alternatively, the lagging may be supplied in fixed lengths, e.g. 1 meter or 2 meter lengths.

An advantage of the insulation which arises out of the use of mineral fibres, especially glass fibres, is that the fire risk which is ever-present with known foam material insulation, is substantially or completely removed.

What is claimed is:

1. Insulation for lagging pipes which comprises a plurality of right cylindrical elements in the form of washers of fibres, said fibres lying substantially in planes perpendicular to the cylindrical axis of said elements, said elements having a bore therein in which said pipe is to be located, and a tubular surface coating of flexible material adhered to said elements holding said elements, said fibres, and said coating together in a predetermined length.

2. Insulation according to claim 1 wherein each element has a radial slit therein which extends into the bore, whereby the elements can be opened out and slipped over a pipe to be lagged.

3. Insulation according to claim 2 wherein said slit extends into the diametrically opposite side of each element.

4. Insulation according to claim 1 wherein said surface coating is applied as a liquid by spraying, brushing or dipping.

5. Insulation according to claim 4 wherein said surface coating is a polyurethane rubber.

* * * * *